(12) United States Patent
Bills et al.

(10) Patent No.: US 8,593,621 B2
(45) Date of Patent: Nov. 26, 2013

(54) TESTING AN OPTICAL FIBER CONNECTION

(75) Inventors: Kevin J. Bills, Austin, TX (US);
Mahesh Bohra, Austin, TX (US); Hong T. Dang, Round Rock, TX (US); Rohan U. Mandrekar, Austin, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 12/771,245

(22) Filed: Apr. 30, 2010

(65) Prior Publication Data

US 2011/0267602 A1     Nov. 3, 2011

(51) Int. Cl.
*G01N 21/00* (2006.01)

(52) U.S. Cl.
USPC ........................................................ 356/73.1

(58) Field of Classification Search
None
See application file for complete search history.

(56) References Cited

U.S. PATENT DOCUMENTS

| | | | |
|---|---|---|---|
| 4,899,045 A | 2/1990 | Kramer | |
| 4,904,050 A | 2/1990 | Dunn et al. | |
| 5,090,802 A * | 2/1992 | Longhurst | 356/73.1 |
| 5,251,001 A * | 10/1993 | Dave et al. | 356/73.1 |
| 5,270,537 A | 12/1993 | Jacobs | |
| 5,394,606 A * | 3/1995 | Kinoshita et al. | 29/705 |
| 5,625,450 A * | 4/1997 | Ikeno | 356/73.1 |
| 5,767,957 A * | 6/1998 | Barringer et al. | 356/73.1 |
| 5,859,695 A * | 1/1999 | Nelson et al. | 356/73.1 |
| 6,259,517 B1 | 7/2001 | Tedesco et al. | |
| 2006/0007426 A1 * | 1/2006 | Weller | 356/73.1 |
| 2008/0144015 A1 * | 6/2008 | Goto et al. | 356/73.1 |

FOREIGN PATENT DOCUMENTS

| | | |
|---|---|---|
| EP | 0754939 B1 | 1/1997 |
| JP | 05347588 A * | 12/1993 |

OTHER PUBLICATIONS

Abidale Cabling Solutions, "Fibre Optic Cabling," 2005, http://www.abidale.com/data%20cabling/default.htm.
Fluke Corporation, "VisiFault™ Visual Fault Locator," 2008, http://www.flukenetworks.com/fnet/en-us/products/VisiFault+Visual+Fault+Locator/Overview.htm.

* cited by examiner

*Primary Examiner* — Gordon Stock, Jr.
(74) *Attorney, Agent, or Firm* — James L. Baudino; Matthew B. Talpis (57) ABSTRACT

For testing whether an optical fiber is properly connected to a device, a beam of light is output to the optical fiber. An intensity is detected of light reflected by the device back through the optical fiber in response to the beam of light. In response to the detected intensity, a determination is made of whether the optical fiber is properly connected to the device.

19 Claims, 6 Drawing Sheets

| Case | L1: L2 | Result |
|---|---|---|
| Case 0 | 0  0 | Bad connection |
| Case 1 | 0  1 | Bad connection |
| Case 2 | 1  0 | Good connection |
| Case 3 | 1  1 | Bad connection |

*FIG. 7*

| Case | L1: L2 | Result |
|---|---|---|
| Case 0 | 0  0 | Bad connection |
| Case 1 | 0  1 | Good connection |
| Case 2 | 1  0 | Bad connection |
| Case 3 | 1  1 | Bad connection |

TESTING AN OPTICAL FIBER CONNECTION

BACKGROUND

The disclosures herein relate in general to information handling systems, and in particular to testing an optical fiber connection.

For testing whether an optical fiber is properly connected to a device under test, the device under test may be installed within its target information handling system and operated under electrical power, in an attempt to activate the optical fiber as part of such information handling system's operation. However, such testing has potential shortcomings, because: (a) in response to error in operation of the device under test within its target information handling system, a precise location of optical fiber disconnection may be difficult to identify, especially if numerous optical fibers are connected to the device under test; and (b) even if the precise location of optical fiber disconnection is identified, the device under test may need to be removed from its target information handling system before resolving the optical fiber disconnection. Such installation and removal of the device under test may be cumbersome and time-consuming, especially if such installation of the device under test is deeply embedded within a complex mechanical structure of its target information handling system.

BRIEF SUMMARY

For testing whether an optical fiber is properly connected to a device, a beam of light is output to the optical fiber. An intensity is detected of light reflected by the device back through the optical fiber in response to the beam of light. In response to the detected intensity, a determination is made of whether the optical fiber is properly connected to the device.

DETAILED DESCRIPTION

Figure 1:
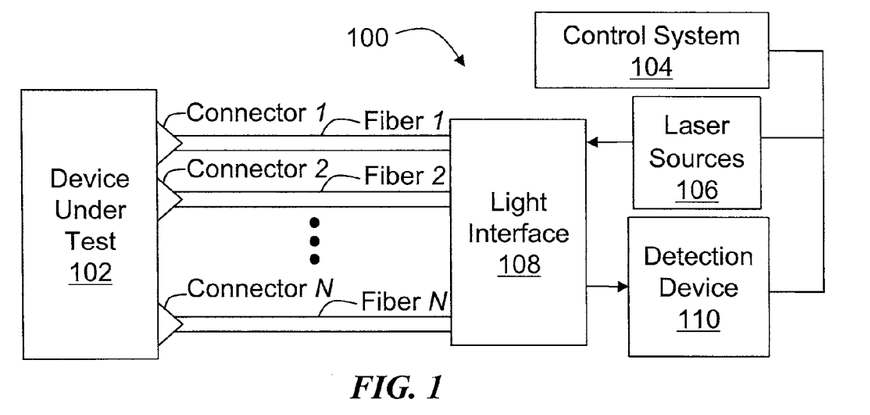
FIG. 1 is a block diagram of a system for testing whether N optical fibers are properly connected to a device under test at respective N connectors, according to the illustrative embodiment.

FIG. 1 is a block diagram of a system, indicated generally at 100, for testing whether N optical fibers (labeled as fibers 1 through N in FIG. 1, where N is an integer number) are properly connected to a device under test 102 at respective N connectors (labeled as connectors 1 through N in FIG. 1), according to the illustrative embodiment. During such testing, the device under test 102 is not required to be operated under electrical power and is not required to be installed within its target information handling system. For example, during such testing, the device under test 102 may be disconnected from electrical power and may be uninstalled from its target information handling system, which may contain a large number of optical fiber connectors. By testing a large number N of such optical fibers before installation of the device under test 102 within its target information handling system, a precise location of optical fiber disconnection is more readily identified and resolved, and the device under test 102 need not be removed from its target information handling system before resolving the optical fiber disconnection.

A control system 104 outputs signals to laser sources 106. In response to such signals from the control system 104, the laser sources 106 output a single beam of light (e.g., either a first beam of light from a first one of the laser sources 106 or a second beam of light from a second one of the laser sources 106) through a light interface 108 to the fibers 1 through N, which transmit such light to the connectors 1 through N, respectively, simultaneously with one another. The first beam of light has a first wavelength, and the second beam of light has a second wavelength (which is different from the first wavelength). In the illustrative embodiment, the first wavelength is 800 nm, and the second wavelength is 650 nm.

The first one of the laser sources 106 outputs the first beam of light during a first period of time. The second one of the laser sources 106 outputs the second beam of light during a second period of time. The control system 104 outputs the signals to the laser sources 106, so that: (a) the first and second periods of time are nonoverlapping with one another; and (b) accordingly, at any particular moment, the first and second ones of the laser sources 106 do not output the first and second beams of light simultaneously with one another.

At the connectors 1 through N, the device under test 102 reflects such light at the second wavelength back through the fibers 1 through N, respectively, simultaneously with one another. Such reflected light is measured by a detector, such as a detection device 110. In response to such measurement, the detection device 110 outputs signals to the control system 104. In response to such signals from the detection device 110, the control system 104 stores and/or displays (to a user) results of such testing.

Figure 2:
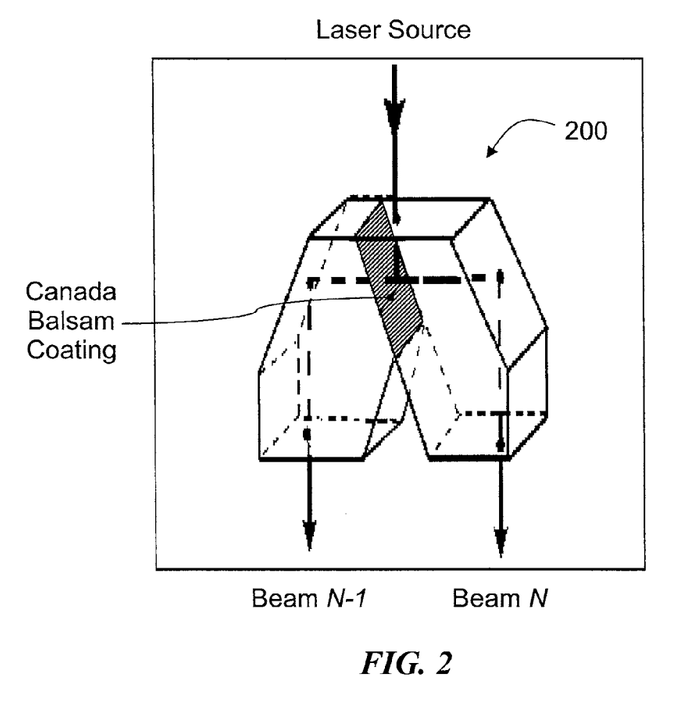
FIG. 2 is a diagram of a first portion of a light interface of the system of FIG. 1.

FIG. 2 is a diagram of a first portion of the light interface 108. The light interface 108 includes various beam splitters, such as a beam splitter 200 of FIG. 2, which is a representative one of the various beam splitters. The beam splitter 200 includes a Canada balsam coating, which is shown as a shaded area in FIG. 2.

The beam splitter 200: (a) receives a beam of light from the laser sources 106 (e.g., the first beam of light from the first one of the laser sources 106); and (b) splits the received beam of light into multiple beams of light having the same wavelength as the received beam of light. In the example of FIG. 2, the beam splitter 200 splits the received beam of light into: (a) a beam N for transmission through the fiber N; and (b) a beam N–1 for transmission through the fiber N–1. Accordingly, with the various beam splitters and associated lenses, the light interface 108: (a) in a first test operation, directs the first beam of light (having the first wavelength) from the first one of the laser sources 106 for transmission through each fiber n of the fibers 1 through N, in the manner discussed hereinbelow in connection with FIG. 3; and (b) in a second test operation, directs the second beam of light (having the second wavelength) from the second one of the laser sources 106 for transmission through each fiber n of the fibers 1 through N, in the manner discussed hereinbelow in connection with FIG. 3.

Figure 3:
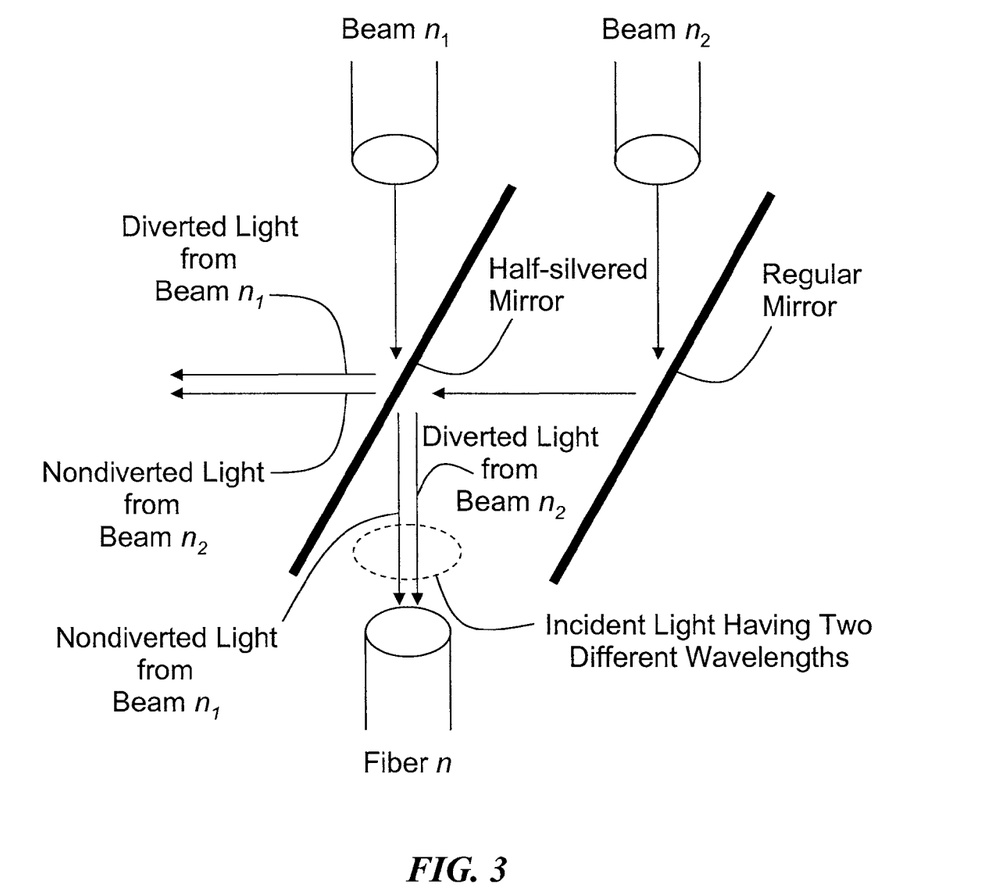
FIG. 3 is a diagram of a second portion of the light interface of the system of FIG. 1.

FIG. 3 is a diagram of a second portion of the light interface 108. The light interface 108 receives the first and second beams of light from the laser sources 106 and directs such light (as respective beams $n_1$ and $n_2$) to each fiber n of the fibers 1 through N, where n is an integer number from 1 through N. Accordingly, beam $n_1$ has the first wavelength, and beam $n_2$ has the second wavelength, which is different from the first wavelength.

As shown in FIG. 3, the light interface 108 directs the beam $n_1$ to a half-silvered mirror, which: (a) allows a first portion of the beam $n_1$ (labeled in FIG. 3 as nondiverted light from beam $n_1$) to continue through the half-silvered mirror and through the fiber n; and (b) diverts a second portion of the beam $n_1$ (labeled in FIG. 3 as diverted light from beam $n_1$) away from the half-silvered mirror and away from the fiber n. Further, the light interface 108 directs the beam $n_2$ to a regular mirror, which reflects the beam $n_2$ to the half-silvered mirror. As shown in FIG. 3, the half-silvered mirror: (a) diverts a first portion of the beam $n_2$ (labeled in FIG. 3 as diverted light from beam $n_2$) away from the half-silvered mirror to continue through the fiber n; and (b) allows a second portion of the beam $n_2$ (labeled in FIG. 3 as nondiverted light from beam $n_2$) to continue through the half-silvered mirror away from the fiber n.

Accordingly: (a) in the first test operation, the first portion of the beam $n_1$ continues through the fiber n, so that the fiber n transmits incident light having the first wavelength; and (b) in the second test operation, the first portion of the beam $n_2$ continues through the fiber n, so that the fiber n transmits incident light having the second wavelength. In this manner, the light interface 108 is suitable for directing (through the fiber n) incident light having two different wavelengths (namely, the first wavelength of the beam $n_1$ in the first test operation, and the second wavelength of the beam $n_2$ in the second test operation).

Figure 4:
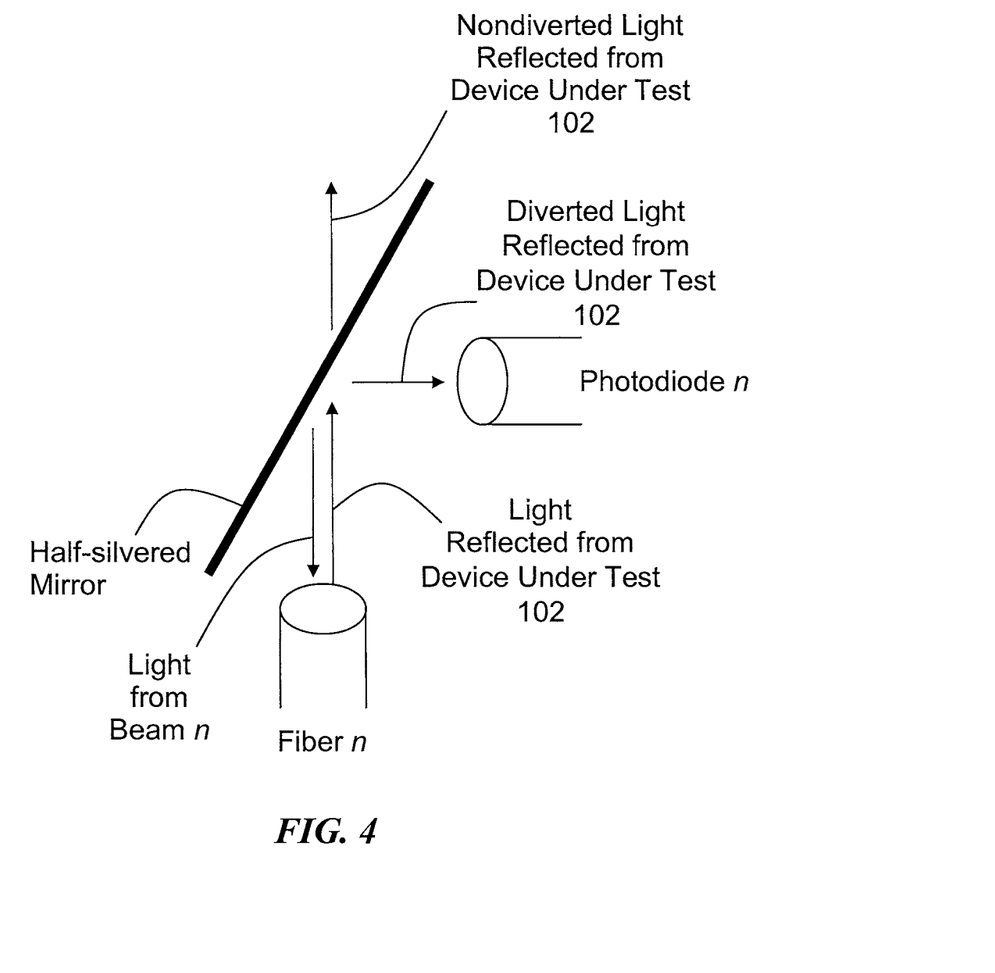
FIG. 4 is a diagram of a third portion of the light interface of the system of FIG. 1.

FIG. 4 is a diagram of a third portion of the light interface 108. As shown in FIG. 4, light from a beam n continues through the fiber n, in the manner discussed hereinabove in connection with FIG. 3. In the first test operation, the beam n (FIG. 4) refers to the beam $n_1$ (FIG. 3). In the second test operation, the beam n (FIG. 4) refers to the beam $n_2$ (FIG. 3).

As shown in FIG. 4, light from the beam n (which the light interface 108 directs for transmission through the fiber n in the manner discussed hereinabove in connection with FIG. 3) is reflected by the device under test 102 back through the fiber n, and such reflected light is measured by the detection device 110 (which includes a photodiode n). The light interface 108 directs such reflected light to a half-silvered mirror, which: (a) diverts a first portion of such reflected light (labeled in FIG. 4 as diverted light reflected from device under test 102) away from the half-silvered mirror to the photodiode n; and (b) allows a second portion of such reflected light (labeled in FIG. 4 as nondiverted light reflected from device under test 102) to continue through the half-silvered mirror away from the photodiode n.

Figure 5:
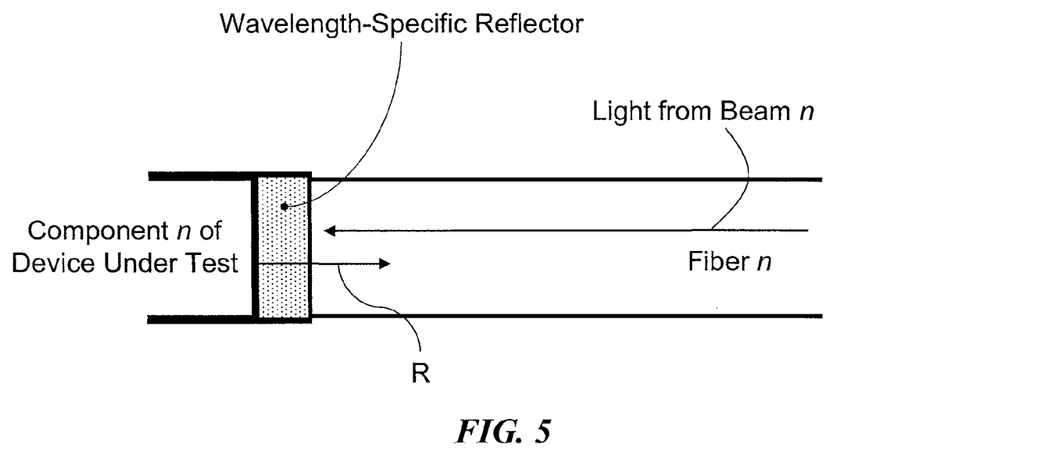
FIG. 5 is a diagram of a connection between a representative optical fiber and the device under test of FIG. 1.

FIG. 5 is a diagram of a connection between a representative fiber n and the device under test 102. The connector n (of the connectors 1 through N) has a respective associated component n, which is either a laser n or a PIN diode n of the device under test 102. As shown in the example of FIG. 5, if the component n is the PIN diode n of the device under test 102, then the connector n includes a wavelength-specific reflector on the PIN diode n. Such wavelength-specific reflector is for contact with the fiber n and is suitable for reflecting light at the second wavelength from the beam $n_2$ when the fiber n is properly connected to the device under test 102 at the connector n. In the illustrative embodiment, if the component n is the laser n of the device under test 102, then the connector n does not include such wavelength-specific reflector on the laser n, because the laser n itself operates as a wavelength-specific reflector, which is suitable for reflecting light at the first wavelength from the beam $n_1$ when the fiber n is properly connected to the device under test 102 at the connector n.

The laser n is suitable for outputting a beam of light at the first wavelength. Accordingly, the laser n is suitable for: (a) reflecting light at the first wavelength from the beam $n_1$ when the fiber n is properly connected to the device under test 102; and (b) effectively "absorbing" light at the second wavelength from the beam $n_2$ when the fiber n is properly connected to the device under test 102.

The PIN diode n is suitable for detecting a beam of light at the first wavelength. Accordingly, the PIN diode n is suitable for: (a) effectively "absorbing" light at the first wavelength from the beam $n_1$ when the fiber n is properly connected to the device under test 102; and (b) reflecting light at the second wavelength from the beam $n_2$ when the fiber n is properly connected to the device under test 102.

As shown in FIG. 5, light from the beam n continues through the fiber n, in the manner discussed hereinabove in connection with FIG. 3 and FIG. 4. In the first test operation, the beam n (FIG. 5) refers to the beam $n_1$ (FIG. 3). In the second test operation, the beam n (FIG. 5) refers to the beam $n_2$ (FIG. 3). As shown in FIG. 5, light from the beam n is reflected by the component n (e.g., laser n or PIN diode n) of the device under test 102 back through the fiber n, and such reflected light (labeled as R in FIG. 5) is measured by the detection device 110.

As discussed hereinabove in connection with FIG. 3, the light interface 108 is suitable for directing (through the fiber n) incident light having two different wavelengths (namely, the first wavelength of the beam $n_1$ in the first test operation, and the second wavelength of the beam $n_2$ in the second test operation). If the component n is the laser n of the device under test 102, and if the connection is good between the fiber n and the laser n, then: (a) in the first test operation (in which the beam n is the beam $n_1$ having the first wavelength), a relatively high intensity of the reflected light R is measured by the detection device 110; and (b) in the second test operation (in which the beam n is the beam $n_2$ having the second wavelength), a relatively low intensity of the reflected light R is measured by the detection device 110. If the component n is the PIN diode n of the device under test 102, and if the connection is good between the fiber n and the PIN diode n, then: (a) in the first test operation (in which the beam n is the beam $n_1$ having the first wavelength), a relatively low intensity of the reflected light R is measured by the detection device 110; and (b) in the second test operation (in which the beam n is the beam $n_2$ having the second wavelength), a relatively high intensity of the reflected light R is measured by the detection device 110.

Figure 6:
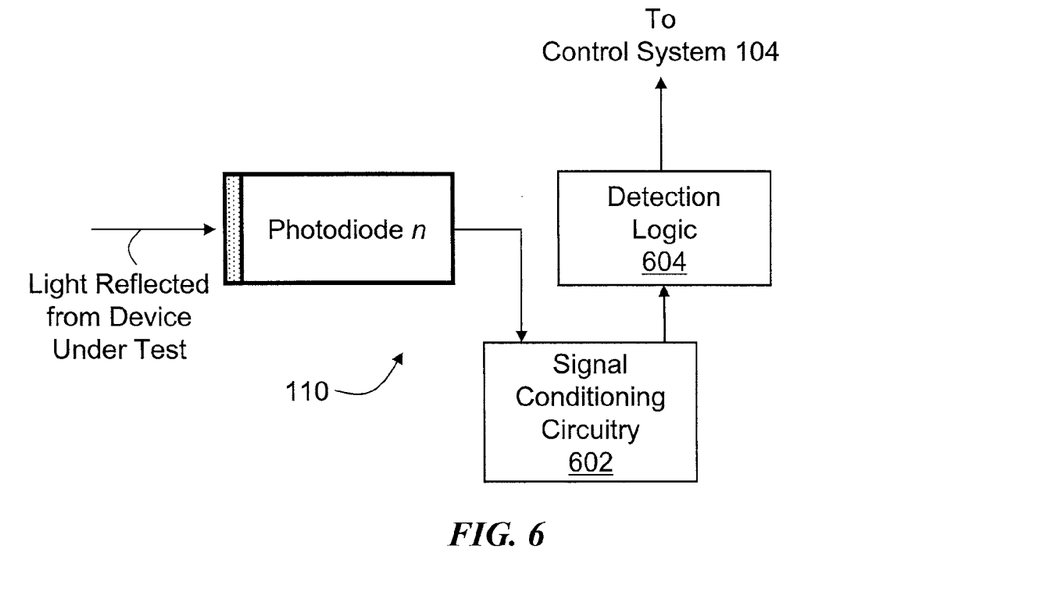
FIG. 6 is a block diagram of a detection device of the system of FIG. 1.

FIG. 6 is a block diagram of the detection device 110. As shown in FIG. 6, the detection device 110 includes (per fiber n) a respectively associated photodiode n, which: (a) receives the reflected light R from the device under test 102 via the fiber n; and (b) generates and conducts electrical current in response to intensity of the reflected light R.

In the illustrative embodiment, each photodiode n includes a respective PIN diode operated in the reversed biased mode. In response to the reflected light R, the PIN diode generates and conducts electrical current, which indicates a relative intensity of the reflected light R. For example, a relatively low amount of such electrical current indicates a relatively low intensity of the reflected light R. Conversely, a relatively high amount of such electrical current indicates a relatively high intensity of the reflected light R. Accordingly, the photodiode n is suitable for generating and conducting: (a) a relatively low amount of such electrical current in response to a relatively low intensity of the reflected light R; and (b) a relatively high amount of such electrical current in response to a relatively high intensity of the reflected light R.

In the first test operation (in which the beam n is the beam $n_1$ having the first wavelength), and in the second test operation (in which the beam n is the beam $n_2$ having the second wavelength): (a) signal conditioning circuitry 602 senses electrical current (if any) conducted by the photodiode n; (b) in response to such electrical current indicating a relatively high intensity of the reflected light R, the signal conditioning circuitry 602 outputs a "high" signal (having a logical 1 "true" state) to detection logic 604; and (c) in response to such electrical current indicating a relatively low intensity of the reflected light R, the signal conditioning circuitry 602 outputs a "low" signal (having a logical 0 "false" state) to the detection logic 604.

In response to the signals from the signal conditioning circuitry 602, the detection logic 604: (a) determines results of such test operations; and (b) outputs such results to the control system 104. The control system 104 receives such results and, in response thereto, stores and/or displays them.

Figure 7:
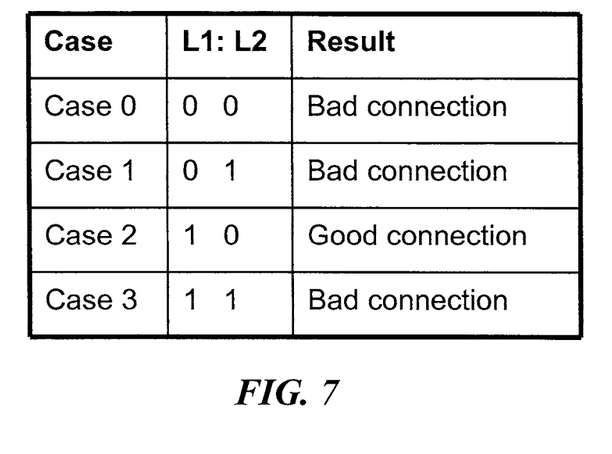
FIG. 7 is a first truth table of detection logic of the detection device of FIG. 6.

FIG. 7 is a first truth table of the detection logic 604, in a case where the component n is the laser n. In the truth table of FIG. 7: (a) L1 is the first test operation (in which the beam n is the beam $n_1$ having the first wavelength); and (b) L2 is the second test operation (in which the beam n is the beam $n_2$ having the second wavelength). As discussed further hereinabove in connection with FIG. 5, if the connection is good between the fiber n and the laser n ("Case 2"), then: (a) in L1, a relatively high intensity of the reflected light R is measured by the detection device 110, and the signal conditioning circuitry 602 outputs a "high" signal (having a logical 1 "true" state) to the detection logic 604; and (b) in L2, a relatively low intensity of the reflected light R is measured by the detection device 110, and the signal conditioning circuitry 602 outputs a "low" signal (having a logical 0 "false" state) to the detection logic 604.

By comparison, if the connection is bad between the fiber n and the laser n, then either:

(a) a relatively low intensity of the reflected light R is measured by the detection device 110 in both L1 and L2, in which event the signal conditioning circuitry 602 outputs a "low" signal (having a logical 0 "false" state) to the detection logic 604 in both L1 and L2 ("Case 0");

(b) a relatively low intensity of the reflected light R is measured by the detection device 110 in L1, in which event the signal conditioning circuitry 602 outputs a "low" signal (having a logical 0 "false" state) to the detection logic 604 in L1; and a relatively high intensity of the reflected light R is measured by the detection device 110 in L2, in which event the signal conditioning circuitry 602 outputs a "high" signal (having a logical 1 "true" state) to the detection logic 604 in L2 ("Case 1"); or (c) a relatively high intensity of the reflected light R is measured by the detection device 110 in both L1 and L2, in which event the signal conditioning circuitry 602 outputs a "high" signal (having a logical 1 "true" state) to the detection logic 604 in both L1 and L2 ("Case 3").

Case 0 may result from misalignment of the fiber n relative to the connector n, so that the laser n fails to reflect light at the first wavelength from the beam $n_1$.

In Case 1, the fiber n and/or the connector n: (a) effectively "absorb" light at the first wavelength from the beam $n_1$; and (b) reflect light at the second wavelength from the beam $n_2$. Case 1 may result from possible dust between the fiber n and the connector n.

Case 3 may result from a condition in which an object at the end of the fiber n reflects: (a) light at the first wavelength from the beam $n_1$; and (b) light at the second wavelength from the beam $n_2$.

In an example test configuration, each fiber n is connected to a regular mirror instead of the device under test 102. In such example test configuration, the system 100 is operable to test itself by: (a) determining whether the signal conditioning circuitry 602 outputs a "high" signal (having a logical 1 "true" state) to the detection logic 604 in both L1 and L2 ("Case 3") for each fiber n; and (b) outputting results of such determination to a human user via the control system 104. In such example test configuration, if the results of such determination are Case 3 for each fiber n, then the system 100 successfully passes such test.

Figure 8:
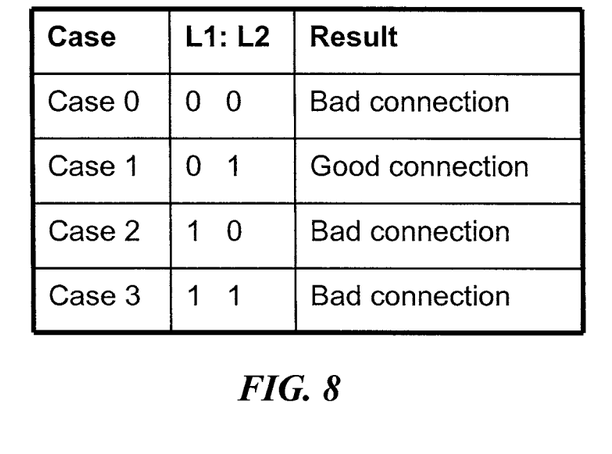
FIG. 8 is a second truth table of the detection logic of the detection device of FIG. 6.

FIG. 8 is a second truth table of the detection logic 604, in a case where the component n is the PIN diode n. In the truth table of FIG. 8: (a) L1 is the first test operation (in which the beam n is the beam $n_1$ having the first wavelength); and (b) L2 is the second test operation (in which the beam n is the beam $n_2$ having the second wavelength). As discussed further hereinabove in connection with FIG. 5, if the connection is good between the fiber n and the PIN diode n ("Case 1"), then: (a) in L1, a relatively low intensity of the reflected light R is measured by the detection device 110, and the signal conditioning circuitry 602 outputs a "low" signal (having a logical 0 "false" state) to the detection logic 604; and (b) in L2, a relatively high intensity of the reflected light R is measured by the detection device 110, and the signal conditioning circuitry 602 outputs a "high" signal (having a logical 1 "true" state) to the detection logic 604.

By comparison, if the connection is bad between the fiber n and the PIN diode n, then either:

(a) a relatively low intensity of the reflected light R is measured by the detection device 110 in both L1 and L2, in which event the signal conditioning circuitry 602 outputs a "low" signal (having a logical 0 "false" state) to the detection logic 604 in both L1 and L2 ("Case 0");

(b) a relatively high intensity of the reflected light R is measured by the detection device 110 in L1, in which event the signal conditioning circuitry 602 outputs a "high" signal (having a logical 1 "true" state) to the detection logic 604 in L1; and a relatively low intensity of the reflected light R is measured by the detection device 110 in L2, in which event the signal conditioning circuitry 602 outputs a "low" signal (having a logical 0 "false" state) to the detection logic 604 in L2 ("Case 2"); or (c) a relatively high intensity of the reflected light R is measured by the detection device 110 in both L1 and L2, in which event the signal conditioning circuitry 602 outputs a "high" signal (having a logical 1 "true" state) to the detection logic 604 in both L1 and L2 ("Case 3").

Case 0 may result from misalignment of the fiber n relative to the connector n, so that the PIN diode n fails to reflect light at the second wavelength from the beam $n_2$.

In Case 2, the fiber n and/or the connector n: (a) reflect light at the first wavelength from the beam $n_1$; and (b) effectively "absorb" light at the second wavelength from the beam $n_2$. Case 2 may result from possible dust between the fiber n and the connector n.

Case 3 may result from a condition in which an object at the end of the fiber n reflects: (a) light at the first wavelength from the beam $n_1$; and (b) light at the second wavelength from the beam $n_2$.

In the illustrative embodiment, the detection device 110 measures intensity of the reflected light R by detecting whether such intensity exceeds a threshold, so that: (a) if such intensity is above such threshold, then the detection device 110 measures such intensity as being relatively high; and (b) if such intensity is below such threshold, the detection device 110 measures such intensity as being relatively low. Accordingly, with the first beam of light having the first wavelength from the first one of the laser sources 106, and with the second beam of light having the second wavelength (which is different from the first wavelength) from the second one of the laser sources 106, the system 100 detects four possible states (Case 0, Case 1, Case 2 or Case 3) of the connection between the fiber n and the device under test 102, which is a relatively easy number of states for testing personnel to learn and use. Moreover, a cost of the laser sources 106 is reduced by directing the first and second beams of light (from the first and second ones of the laser sources 106, respectively) to each fiber n (of the fibers 1 through N) through the light interface 108, so that the number N may be substantially greater than the number (e.g., two) of the laser sources 106. Further, by so directing the first and second beams of light to each fiber n (of the fibers 1 through N) through the light interface 108, the system 100 is suitable for testing whether a large number N (of the fibers 1 through N) are properly connected to the device under test 102 at the respective N connectors, simultaneously with one another, which: (a) enables the control system 104 to store and/or display (to a user) results of such testing in a relatively fast and efficient manner; and (b) reduces a time for assembly and test of the device under test 102 and its target information handling system.

Figure 9:
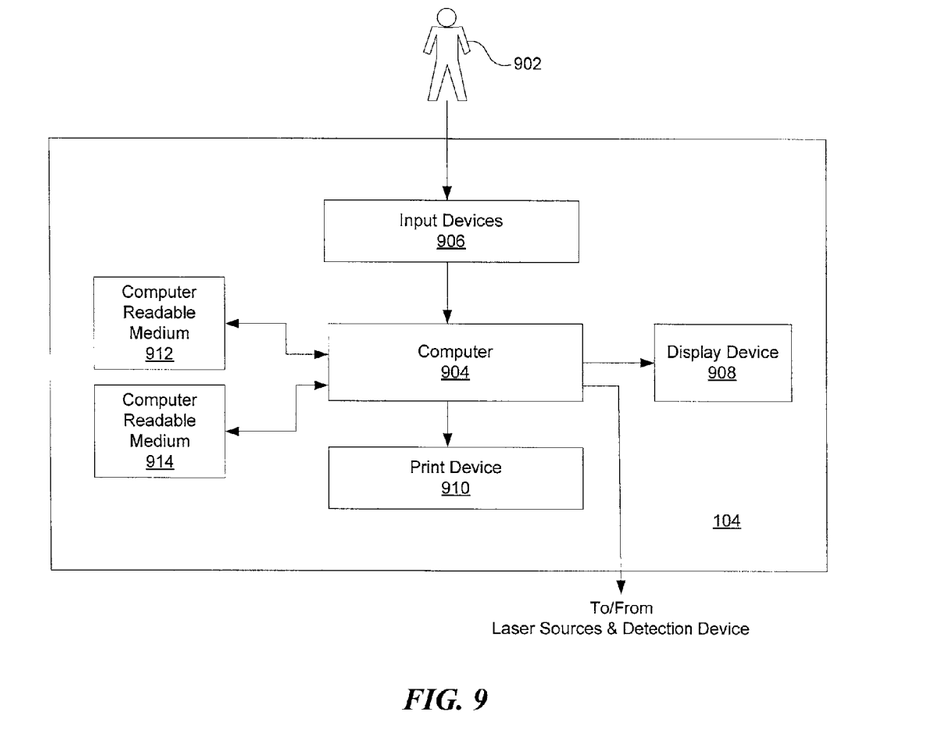
FIG. 9 is a block diagram of a control system of the system of FIG. 1.

FIG. 9 is a block diagram of the control system 104, according to the illustrative embodiment. In the example of FIG. 9, the control system 104 operates in association with a human user 902. The control system 104 is formed by various electronic circuitry components, including: (a) a general purpose computer 904, which is a general purpose computational resource such as a workstation or server, for executing and otherwise processing instructions, and for performing additional operations (e.g., communicating information) in response thereto; (b) input devices 906 for receiving information from the user 902; (c) a display device 908 (e.g., a conventional flat panel monitor) for displaying information to the user 902; (d) a print device 910 (e.g., a conventional electronic printer or plotter) for printing visual images on paper; (e) a computer readable medium (or apparatus) 912 (e.g., a hard disk drive or other nonvolatile storage device) for storing information; (f) a portable computer readable medium (or apparatus) 914 (e.g., a removable flash memory card or CD-ROM) for storing information; and (g) various other electronic circuitry for performing other operations of the control system 104.

For example, the computer 904 includes: (a) a network interface (e.g., circuitry) for communicating between the computer 904 and the laser sources 106 (e.g., outputting information to, and receiving information from, the laser sources 106), such as by transferring information (e.g. instructions, data, signals) between the computer 904 and the laser sources 106, and for communicating between the computer 904 and the detection device 110 (e.g., outputting information to, and receiving information from, the detection device 110), such as by transferring information between the computer 904 and the detection device 110; and (b) a memory device (e.g., random access memory ("RAM") device and/or read only memory ("ROM") device) for storing information (e.g., instructions of software executed by the computer 904, and data processed by the computer 904 in response to such instructions). Accordingly, in the example of FIG. 9, the computer 904 is connected to the laser sources 106, the detection device 110, the input devices 906, the display device 908, the print device 910, the computer readable medium 912, and the computer readable medium 914, as shown in FIG. 9. The computer 904 executes: (a) operating system software (e.g., LINUX operating system software) for performing general purpose tasks; and (b) other processes and applications.

In response to signals from the computer 904, the display device 908 displays visual images, which represent information, and the user 902 views such visual images. Moreover, the user 902 operates the input devices 906 to output information to the computer 904, and the computer 904 receives such information from the input devices 906. Also, in response to signals from the computer 904, the print device 910 prints visual images on paper, and the user 902 views such visual images.

The input devices 906 include, for example, a conventional electronic keyboard (or keypad) and a pointing device, such as a conventional electronic "mouse," rollerball or light pen. The user 902 operates the keyboard (or keypad) to output alphanumeric text information to the computer 904, which receives such alphanumeric text information. The user 902 operates the pointing device to output cursor-control information to the computer 904, and the computer 904 receives such cursor-control information. The input devices 906 also include, for example, touch-sensitive circuitry of a liquid crystal display ("LCD") device.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including, but not limited to, firmware, resident software, or microcode) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be used in the illustrative embodiment. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium (including, but not limited to, wireless, wireline, optical fiber cable, RF, or any suitable combination of the foregoing).

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions (which execute via the processor of the computer or other programmable data processing apparatus) are processable to cause performance of the functions/acts specified in the flowchart and/or block diagram block or blocks.

These computer program instructions may also be stored in a computer readable medium that can direct a computer, other programmable data processing apparatus, or other devices to operate in a particular manner, such that the instructions stored in the computer readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions that execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the illustrative embodiments. In this regard, each block in the flowchart or block diagrams may represent a module, segment, or portion of code, which includes one or more executable instructions for implementing the specified logical operation(s). In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified operations or acts, or combinations of special purpose hardware and computer instructions.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A system for testing whether an optical fiber is properly connected to a device, comprising:
    a first laser source operable to output a first beam of light having a first wavelength to the optical fiber;
    a second laser source operable to output a second beam of light having a second wavelength different than the first wavelength to the optical fiber; and
    a detector operable to:
        detect a first intensity of light reflected by the device back through the optical fiber in response to the first beam of light;
        detect a second intensity of light reflected by the device back through the optical fiber in response to the second beam of light; and
        determine, in response to the detected first and second intensities, whether the optical fiber is properly connected to the device, and
    wherein the detector is operable to determine whether the optical fiber is properly connected to the device at a connector, wherein the connector includes a component functioning as a wavelength-specific reflector for reflecting the first beam of light and absorbing the second beam of light when the optical fiber is properly connected to the device.

2. The system of claim 1, wherein the detector is operable to determine, in response to the detected first intensity being relatively low and the detected second intensity being relatively high, that the optical fiber is properly connected to the device.

3. The system of claim 1, wherein the first laser source is operable to output the first beam of light during a first period of time, wherein the second laser source is operable to output the second beam of light during a second period of time, and wherein the first and second periods of time are nonoverlapping with one another.

4. The system of claim 1, wherein the optical fiber is one of a plurality of optical fibers, and comprising:
a light interface, wherein the first and second laser sources are operable to output the respective first and second beams of light through the light interface to the plurality of optical fibers, simultaneously with one another, and wherein the detector is operable to detect respective intensities of light reflected by the device back through the plurality of optical fibers, simultaneously with one another, in response to the first and second beams of light and determine, in response to the detected respective intensities, whether the plurality of optical fibers are properly connected to the device.

5. The system of claim 1, wherein the detector is operable to detect whether the first or second intensities of light exceeds a threshold and determine, in response to detecting whether the first or second intensities exceeds the threshold, whether the optical fiber is properly connected to the device.

6. The system of claim 1, wherein the device is disconnected from electrical power.

7. A method of testing whether an optical fiber is properly connected to a device, the method comprising:
outputting a first beam of light having a first wavelength to the optical fiber;
outputting a second beam of light having a second wavelength different than the first wavelength to the optical fiber;
detecting a first intensity of light reflected by the device back through the optical fiber in response to the first beam of light;
detecting a second intensity of light reflected by the device back through the optical fiber in response to the second beam of light; and
determining, in response to the detected first and second intensities, whether the optical fiber is properly connected to the device at a connector, wherein the connector includes a component functioning as a wavelength-specific reflector for reflecting the first beam of light and absorbing the second beam of light when the optical fiber is properly connected to the device.

8. The method of claim 7, wherein the determining comprises:
determining, in response to the detected first intensity being relatively low and the detected second intensity being relatively high, that the optical fiber is properly connected to the device.

9. The method of claim 7, wherein:
outputting the first beam of light comprises outputting the first beam of light during a first period of time; and
outputting the second beam of light comprises outputting the second beam of light during a second period of time, wherein the first and second periods of time are nonoverlapping with one another.

10. The method of claim 7, wherein the optical fiber is one of a plurality of optical fibers, and wherein:
the outputting of the first and second beams of light comprises outputting the first and second beams of light through a light interface to the plurality of optical fibers, simultaneously with one another;
the detecting comprises detecting respective intensities of light reflected by the device back through the plurality of optical fibers, simultaneously with one another, in response to the first and second beams of light; and
the determining comprises determining, in response to the detected respective intensities, whether the plurality of optical fibers are properly connected to the device.

11. The method of claim 7, wherein:
the detecting comprises detecting whether the first or second intensities of light exceeds a threshold; and
the determining comprises determining, in response to detecting whether the first or second intensities exceeds the threshold, whether the optical fiber is properly connected to the device.

12. The method of claim 7, wherein the detecting comprises:
detecting the first and second intensities of light reflected by the device back through the optical fiber in response to the first and second beams of light, wherein the device is disconnected from electrical power.

13. A system for testing whether a plurality of optical fibers are properly connected to a device at respective connectors, comprising:
a first laser source for outputting a first beam of light to the plurality of optical fibers, wherein the first beam of light has a first wavelength;
a second laser source for outputting a second beam of light to the plurality of optical fibers, wherein the second beam of light has a second wavelength different from the first wavelength;
a detector for:
detecting first respective intensities of light reflected by the device back through the plurality of optical fibers, simultaneously with one another, in response to the first beam of light;
detecting second respective intensities of light reflected by the device back through the plurality of optical fibers, simultaneously with one another, in response to the second beam of light; and
determining, in response to the detected first respective intensities being relatively low and the detected second respective intensities being relatively high, that the plurality of optical fibers are properly connected to the device at the respective connectors, wherein the respective connectors are suitable for: effectively absorbing the first beam of light when the plurality of optical fibers are properly connected to the device at the respective connectors; and reflecting the second beam of light when the plurality of optical fibers are properly connected to the device at the respective connectors.

14. The system of claim 13, wherein the detector is for: detecting the first respective intensities of light by detecting whether the first respective intensities of light exceed a threshold; detecting the second respective intensities of light by detecting whether the second respective intensities of light exceed the threshold; and determining, in response to the detected first respective intensities being below the threshold and the detected second respective intensities being above the threshold, that the plurality of optical fibers are properly connected to the device at the respective connectors.

15. The system of claim 13, wherein the device is disconnected from electrical power.

16. The system of claim 13, wherein the first laser source is for outputting the first beam of light during a first period of time, wherein the second laser source is for outputting the second beam of light during a second period of time, and wherein the first and second periods of time are nonoverlapping with one another.

17. The system of claim 16, and comprising:
a light interface, wherein the first laser source is for outputting the first beam of light through the light interface to the plurality of optical fibers, simultaneously with one another, and wherein the second laser source is for outputting the second beam of light through the light interface to the plurality of optical fibers, simultaneously with one another.

18. A system for testing whether optical fibers are properly connected to a device, comprising:
a laser source for outputting a beam of light to a plurality of optical fibers;
a light interface, wherein the laser source is for outputting the beam of light through the light interface to the plurality of optical fibers, simultaneously with one another; and
a detector for:
detecting respective intensities of light reflected by the device back through the plurality of optical fibers, simultaneously with one another, in response to the beam of light; and
determining, in response to the detected respective intensities, whether the plurality of optical fibers are properly connected to the device.

19. A method of testing whether optical fibers are properly connected to a device, the method comprising:
outputting a beam of light through a light interface to a plurality of optical fibers, simultaneously with one another;
detecting respective intensities of light reflected by the device back through the plurality of optical fibers, simultaneously with one another, in response to the beam of light; and
determining, in response to the detected respective intensities, whether the plurality of optical fibers are properly connected to the device.

* * * * *